No. 781,265. PATENTED JAN. 31, 1905.
W. O. BROWN.
VARIABLE SPEED GEAR.
APPLICATION FILED APR. 29, 1904.

Witnesses
Walker Banning.
Mildred Sadler.

Inventor
William O. Brown
By Banning & Banning
Attys.

No. 781,265. Patented January 31, 1905.

UNITED STATES PATENT OFFICE.

WILLIAM O. BROWN, OF CHICAGO, ILLINOIS, ASSIGNOR TO APPLETON J. PATTISON, OF TORONTO, ONTARIO, CANADA.

VARIABLE-SPEED GEAR.

SPECIFICATION forming part of Letters Patent No. 781,265, dated January 31, 1905.

Application filed April 29, 1904. Serial No. 205,588.

*To all whom it may concern:*

Be it known that I, WILLIAM O. BROWN, a citizen of the United States, residing at Chicago, in the county of Cook and State of Illinois, have invented certain new and useful Improvements in Variable-Speed Gears, of which the following is a specification.

This invention is primarily intended for use on street-railway cars, automobiles, or other power-driven vehicles, but is equally adapted for use in connection with other machinery in which it is desirable to have a gear and clutch mechanism for carrying the degrees of speed transmitted through the gears.

The gears and clutches of the present invention are so arranged and located that the device is adapted to drive both of the journals of a street-railway car, thereby applying power to both pairs of wheels of a car rather than to a single pair.

The invention is particularly adapted for use with hydrocarbon-engines in which it is desirable to operate the engine at a uniform speed and vary the ultimate speed imparted thereby. The gears and clutches are so arranged that they may be automatically operated by a suitable mechanism which will set different clutches at the suitable time, thereby enabling the operator to vary the speed at will.

The invention consists of the features of construction and combination of parts hereinafter described and claimed.

Figure 2:
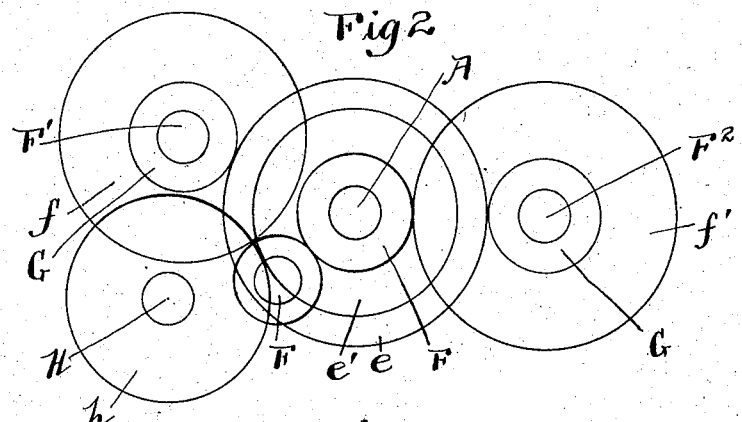
Figure 1:
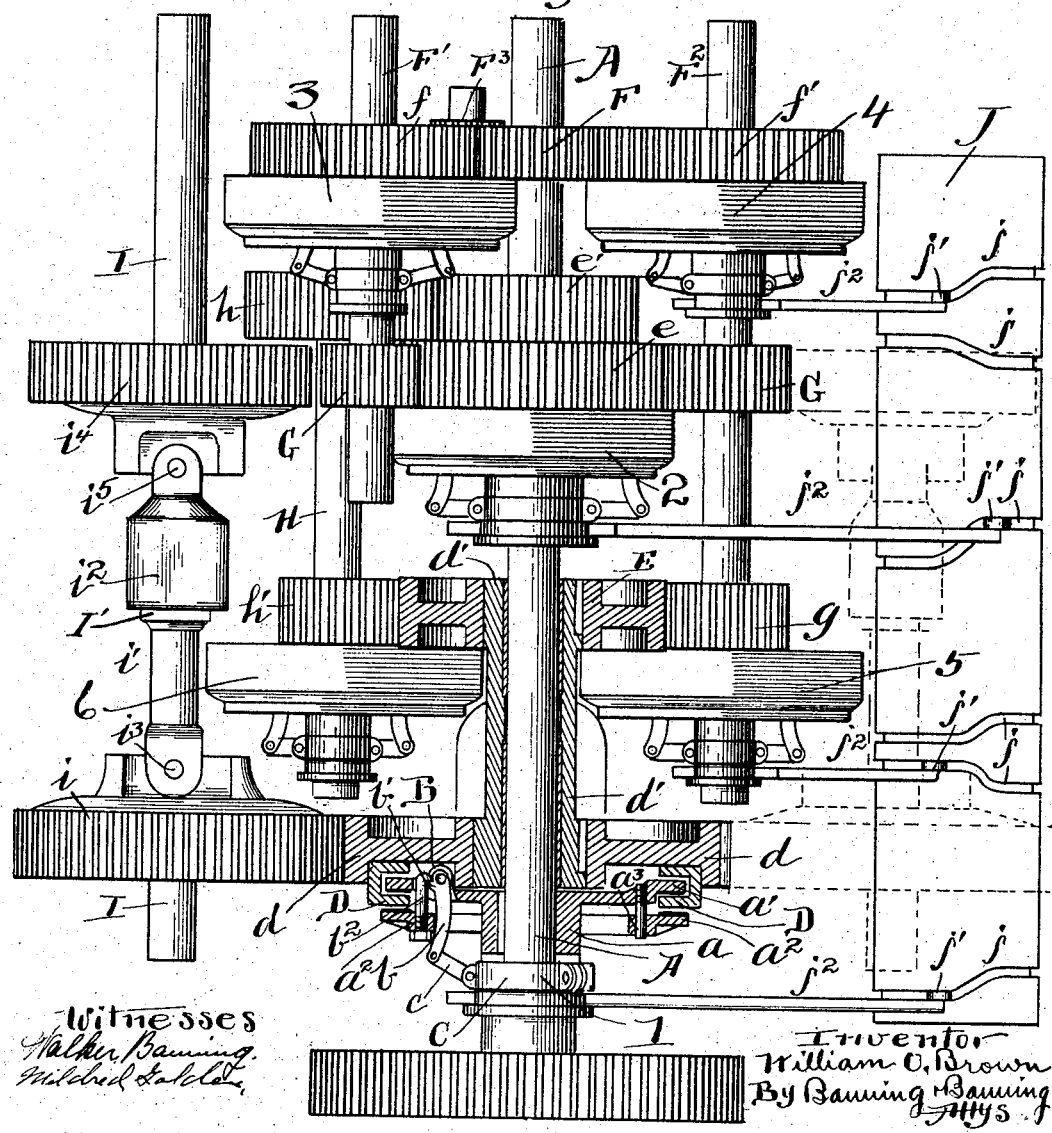

In the drawings illustrating the invention, Figure 1 is a plan view of the gear mechanism, showing one of the companion shafts and attached members in dotted lines for the purpose of clearness; and Fig. 2 a diagrammatic end view showing the vertical position of the several shafts employed.

The drawings illustrating the invention are intended to represent the relative positions and meshing of the different members, which may be located and supported in any suitable and convenient way, the particular method of locating and supporting the shafts with respect to the car or other mechanism forming no part of the present invention.

Power is applied to the centrally-located shaft A, to which is keyed a slidable collar $a$, (shown in section,) which collar is provided with an outwardly-extending circular flange $a'$, which forms one of the clutching members and is adapted to coöperate with a slidable clutching-ring $a^2$, which ring is slidably mounted by means of studs $a^3$, to allow the inner and outer clutching members to be moved toward and from one another. The flange is provided with ears B, to which are pivoted outwardly-extending arms $b$, provided each with an abutment $b'$, adapted to engage with an inwardly-projecting notched stud $b^2$, carried by the outer clutching-ring $a^2$. The outer end of the arm $b$ is pivoted to a link $c$, which in turn is pivoted to a clutch-collar C, which is keyed to the shaft.

The particular clutch mechanism hitherto described serves for the purposes of illustration; but the invention is not limited to a single clutch mechanism of any particular style, but rather to the method of arranging a series of clutches and gears to transmit varying degrees of speed from one shaft to another.

The inner and outer clutch members hitherto described are adapted to contact with the inner and outer faces of an inwardly-projecting flange D, which forms the clutched member and which is rigidly attached to a gear-wheel $d$, which in turn is keyed to a sleeve $d'$, which encircles the shaft and is rotatably mounted thereon. The clutch mechanism hitherto described will be numbered 1 for the purposes of convenience, and the remaining clutch mechanisms will be likewise numbered accordingly.

At the end of the sleeve and keyed thereonto is a gear-wheel E, and beyond the gear-wheel E is a clutch 2, which is keyed to the shaft and is adapted to connect said shaft with gear-wheels $e$ and $e'$, which latter normally run free on the shaft and are formed integral with one another, the gear-wheels $e'$ being of less diameter than the gear-wheel $e$. Near the end of the central power-shaft A is a driving-pinion F of smaller size than any of the gear-wheels hitherto described. Adjacent to the central power-shaft are forward and reverse secondary shafts $F^2$ and $F'$, respectively, each provided with gear-wheels $f$ and $f'$, respectively, the gear-wheel $f'$ meshing with the pinion F and of substantially twice the diameter of said pinion and the gear-wheel $f$ meshing with an idler $F^3$, in mesh with the driving-pinion F for giving a reverse motion. The gear-wheels $f$ and $f'$ are mounted to run free on their respective shafts and are adapted to be cluched thereto by means of clutches 3 and 4, respectively. Each of the secondary shafts has keyed thereon a pinion G, which pinions are of substantially the same size as the pinion F and mesh with the gear-wheel $e$ on the central power-shaft. On the shaft $F^2$ and in addition to the pinion G is a gear-wheel $g$, rotatably mounted on the shaft and adapted to be clutched thereto by means of a clutch 5, and said gear-wheel is of substantially the same size as the pinions hitherto mentioned and meshes with the gear-wheel E, which is of substantially twice the size of the gear-wheel $g$.

Suitably located beneath the shaft $F'$ is a tertiary shaft H, provided with a gear-wheel $h$ of equal size with and meshing with the gear-wheel $e'$, and in addition to said gear-wheel the shaft is provided with a rotatably-mounted gear-wheel $h'$, corresponding to the oppositely-disposed gear-wheel $g$ and of equal size therewith and meshing with the gear-wheel E, and the gear-wheel $h'$ is adapted to be locked to the shaft by means of a clutch 6, which forms the last one of the clutches.

The power is ultimately imparted to shafts I (one of said shafts being shown in dotted lines for the sake of clearness) by means of gear-wheels $i$ of equal size with and meshing with the gear-wheel D, and said shafts I are preferably composed of two sections $i'$ and $i^2$, the former having its end $I'$ squared and slidably mounted within the latter. The section $i'$ is pivoted to the rear face of the gear-wheel $i$ by means of a pin $i^3$, and the section $i^2$ is pivoted to the rear face of the final gear-wheel $i^4$ by means of a pin $i^5$, which arrangement allows for the vibration and play incident to the use of the mechanism. The two final gear-wheels $i^4$ on opposite sides of the mechanism are adapted to impart motion to the forward and rear journals of a car-truck or automobile, so that power will be applied in both directions. In use power is applied to the central power-shaft at a uniform speed, and when it is desired to transmit the lowest speed to the final gear-wheels the clutches 4 and 6 are thrown so that the pinion F will impart half-speed to the gear-wheel $f'$, which is locked to the shaft $F^2$ by the clutch, and pinion G will impart half of the speed of shaft $F^2$ to the gear-wheel $e$, giving one-fourth of the original speed, which one-fourth speed will be imparted to the shaft H, and by throwing the clutch 6 one-eighth speed will be imparted to the gear-wheel E, which gear-wheel is keyed to the sleeve $d^5$, so that the one-eighth speed will likewise be imparted to the gear-wheel $d$ and thence to the two shafts I for actuating the journals at opposite ends of the car or truck. When it is desired to impart one-fourth speed, the clutches 4 and 5 are thrown so that the half-speed of the shaft $F^2$ will be imparted through the pinion to be transformed through the pinion $g$ into one-fourth speed in the gear-wheel E. In a similar manner one-half speed can be obtained by throwing the clutches 2 and 6 and full speed by throwing clutch 1, which locks the gear-wheel $d$ directly to the shaft and imparts full speed to the journals. One-eighth reverse speed can be obtained by throwing the clutches 3 and 6, which imparts one-half speed to the shaft $f'$ and one-fourth speed to the shaft H through the gear-wheels E, E', and H, the latter two being of equal size, and by throwing the clutch 6 the pinion $h'$ will be locked to the shaft and impart one-eighth reverse speed to the gear-wheel E. In a similar manner one-fourth reverse speed can be obtained by throwing the clutches 3 and 5.

The clutches can be automatically operated by any suitable device, and for purposes of illustration a cylinder J has been shown provided with a series of cam-slots $j$, one for each clutch, within which slots operate rollers $j'$, mounted on forked levers $j^2$ for operating the clutch-collars. This arrangement serves merely for purposes of illustration, since the gear mechanism can be operated in any other suitable or well-known way.

It will be seen from the foregoing description that the gear mechanism of the present invention is extremely compact in construction, enabling its installation within a limited space, and that it possesses a great advantage in that it enables power to be applied in both directions, thereby greatly increasing the tractive power of the car or truck, which is a feature of great importance in the art to which the present invention relates.

Another advantage of the present invention lies in the fact that none of the parts composing the device are complicated in themselves, since the device consists entirely in the peculiar arrangement of the shafts, gears, and clutches hereinbefore described.

What I regard as new, and desire to secure by Letters Patent, is—

1. Variable-speed gearing of the character described comprising a driving part, a driven part and two sets of gears of different predetermined ratios adapted to act independently and in coöperation with one another to impart different degrees of speed to the driven part, substantially as described.

2. Variable-speed gearing of the character described comprising a driving part, a driven part and two sets of gears of different predetermined ratios adapted to act independently and in coöperation with one another to impart different degrees of speed to the driven part, and means for locking the driven part to the driving part to obtain full speed therefrom, substantially as described.

3. In variable-speed gearing, the combination of a main shaft, a gear-wheel rotatably mounted thereon for imparting a reduced speed from the shaft, a pinion fixedly mounted on the main shaft, an idler meshing with the gear-wheel, forward and reverse secondary shafts each provided with a proportionately-larger gear-wheel one meshing with and of larger diameter than the pinion on the main shaft and the other meshing with the idler, clutch mechanisms for each of the gear-wheels for locking said wheels to their respective shafts, a fixedly-mounted pinion on each of the secondary shafts, a rotatably-mounted gear-wheel on the main shaft meshing with the pinions on the secondary shafts, a clutch mechanism for locking the gear-wheel to the main shaft, a tertiary shaft adapted to receive rotation from the last-mentioned gear-wheel, a rotatably-mounted gear-wheel and clutch mechanism on the tertiary shaft adapted to impart a reduced speed to the first-mentioned gear-wheel on the main shaft; substantially as described.

4. In variable-speed gearing, the combination of a main shaft, a gear-wheel rotatably mounted thereon for imparting a reduced speed from the shaft, a pinion fixedly mounted on the main shaft, an idler meshing with the pinion, secondary shafts each provided with a proportionately-larger gear-wheel meshing with and of larger diameter than the pinion of the main shaft, one of them meshing with said pinion and the other with the idler, clutch mechanisms for each of the gear-wheels for locking said wheels to their respective shafts, a fixedly-mounted pinion for each of the secondary shafts, a rotatably-mounted gear-wheel on the main shaft meshing with the pinions on the secondary shafts, a clutch mechanism for locking the gear-wheel to the main shaft, a tertiary shaft adapted to receive rotation from the last-mentioned gear-wheel, a rotatably-mounted gear-wheel on the tertiary shaft meshing with the first-mentioned gear-wheel on the main shaft, a clutch coöperating with said gear-wheel on the tertiary shaft, a rotatably-mounted gear-wheel on one of the secondary shafts likewise meshing with the first-mentioned gear-wheel, and a clutch coöperating therewith, substantially as described.

5. In variable-speed gearing, the combination of a main shaft, a secondary shaft capable of being actuated at reduced speed by the main shaft, a connection between the two shafts, a tertiary shaft capable of being actuated at reduced speed by the main shaft, a connection between said shafts, a gear-wheel rotatably mounted on the main shaft, and connections between said gear-wheel and the secondary and tertiary shafts for imparting different degrees of speed to the rotatably-mounted gear-wheel, substantially as described.

6. In variable-speed gearing, the combination of a main shaft, two secondary shafts, one of them being a reverse-shaft, connections between the forward and reversing secondary shafts and the main shaft, a tertiary shaft, a connection between the tertiary shaft and the forward and reverse secondary shafts for imparting a reduced forward or reverse speed thereto, a gear-wheel rotatably mounted on the main shaft, and a connection between said gear-wheel and the tertiary shaft for imparting a reduced forward or reverse speed to the rotatably-mounted gear-wheel, substantially as described.

7. In variable-speed gearing, the combination of a driving part, a driven part and two sets of gears of predetermined ratios adapted to act independently and in coöperation with one another to impart different degrees of speed to the driven part, and a reversing-gear of predetermined ratio adapted to act in combination with the aforesaid sets of gears of different predetermined ratios to impart different degrees of reverse speed to the driven part, substantially as described.

8. In variable-speed gearing, the combination of a driving part, a driven part and two sets of gears of different predetermined ratios adapted to act independently and in coöperation with one another to impart different degrees of speed to the driven part, a reversing-gear of predetermined ratio adapted to act in combination with the aforesaid sets of gears of different predetermined ratios to impart different degrees of reverse speed to the driven part, and means for locking the driven part to the driving part to obtain full forward speed therefrom, substantially as described.

WILLIAM O. BROWN.

Witnesses:
SAMUEL W. BANNING,
WALKER BANNING.